(12) United States Patent
Bertram

(10) Patent No.: US 9,181,992 B2
(45) Date of Patent: Nov. 10, 2015

(54) TORQUE CONVERTER FOR MOTOR VEHICLE

(71) Applicant: FORD GLOBAL TECHNOLOGIES, LLC, Dearborn, MI (US)

(72) Inventor: Ulrich Bertram, Bergheim (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 13/856,248

(22) Filed: Apr. 3, 2013

(65) Prior Publication Data

US 2014/0124319 A1    May 8, 2014

(30) Foreign Application Priority Data

Apr. 4, 2012 (DE) .......................... 10 2012 205 535

(51) Int. Cl.
*F16H 61/14*   (2006.01)
*F16H 45/02*   (2006.01)
*F16D 33/18*   (2006.01)

(52) U.S. Cl.
CPC ................ *F16D 33/18* (2013.01); *F16H 45/02* (2013.01); *F16H 61/14* (2013.01); *F16H 61/142* (2013.01); *F16H 2045/0205* (2013.01); *F16H 2045/0215* (2013.01); *F16H 2045/0221* (2013.01); *F16H 2045/0294* (2013.01)

(58) Field of Classification Search
CPC .......................... F16H 2045/215; F16H 61/142
USPC ........................................................ 192/3.27
See application file for complete search history.

(56) References Cited

U.S. PATENT DOCUMENTS

| | | | | |
|---|---|---|---|---|
| 5,937,978 A * | 8/1999 | Fukushima | ................. | 192/3.29 |
| 7,815,026 B2 * | 10/2010 | Povirk et al. | ................. | 192/3.26 |
| 8,132,655 B2 * | 3/2012 | Sturgin | ................. | 192/3.25 |
| 8,627,934 B2 * | 1/2014 | Murata et al. | ................. | 192/3.26 |
| 2008/0308375 A1 * | 12/2008 | Heeke | ................. | 192/3.29 |
| 2009/0020384 A1 * | 1/2009 | Gooden et al. | ................. | 192/3.3 |
| 2009/0229937 A1 * | 9/2009 | Heeke | ................. | 192/3.25 |

FOREIGN PATENT DOCUMENTS

DE        102007053970 A1      6/2008

\* cited by examiner

*Primary Examiner* — Ramya Burgess
*Assistant Examiner* — Mark Manley
(74) *Attorney, Agent, or Firm* — James Dottavio; MacMillan, Sobanski & Todd, LLC

(57) ABSTRACT

A vehicle transmission torque converter assembly, having: an engine output shaft; a turbine; and a transmission input shaft linkable to either the engine output shaft or turbine via a lock-up clutch. The lock-up clutch is configured to sustain the transmission input shaft being: (i) coupled to the engine output shaft; (ii) coupled to the turbine; or (iii) decoupled.

14 Claims, 1 Drawing Sheet

TORQUE CONVERTER FOR MOTOR VEHICLE

CROSS-REFERENCE TO RELATED APPLICATIONS

This application is a continuation and claims the benefit of German Patent Application No. DE 102012205535.5 titled "Torque Converter for Motor Vehicle" filed Apr. 4, 2012, which is hereby incorporated by reference in its entirety.

TECHNICAL FIELD

The invention relates to vehicle transmission torque converters having a lock-up clutch between an engine output shaft and a transmission input shaft.

BACKGROUND

Some existing automatic transmission designs disclose a torque converter that has an additional clutch with which a transmission input shaft can be uncoupled from a torque converter turbine in order to prevent drag losses during idling, e.g., in the case of a hybrid drive mode. The additional clutch, however adds parts and weight to the vehicle.

Therefore, it is desirable to have a torque converter with a sustainable stage that decouples the transmission input shaft from the turbine and engine output shaft without the need for an additional clutch.

SUMMARY

The present disclosure addresses one or more of the above-mentioned issues. Other features and/or advantages will become apparent from the description which follows.

One advantage of the present disclosure is that it teaches a torque converter with a sustainable stage that decouples the transmission input shaft from the turbine and engine output shaft without the need for an additional clutch.

Another advantage of the present disclosure is that it teaches a torque converter that makes it possible to control a lock-up clutch to be decoupled from the turbine in order to enable engine idling with minimal losses and a smooth transition between drive operation and idling operation.

One exemplary embodiment of the present disclosure relates to a vehicle transmission torque converter assembly, having: an engine output shaft; a turbine; and a transmission input shaft linkable to either the engine output shaft or turbine via a lock-up clutch. The lock-up clutch is configured to sustain the transmission input shaft being: (i) coupled to the engine output shaft; (ii) coupled to the turbine; or (iii) decoupled.

Another exemplary embodiment of the present disclosure relates to a vehicle transmission torque converter assembly, including: a three stage lock-up clutch with a sustainable stage where the transmission input shaft is decoupled from an engine output shaft and a torque converter turbine.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

DETAILED DESCRIPTION

Figure 1:
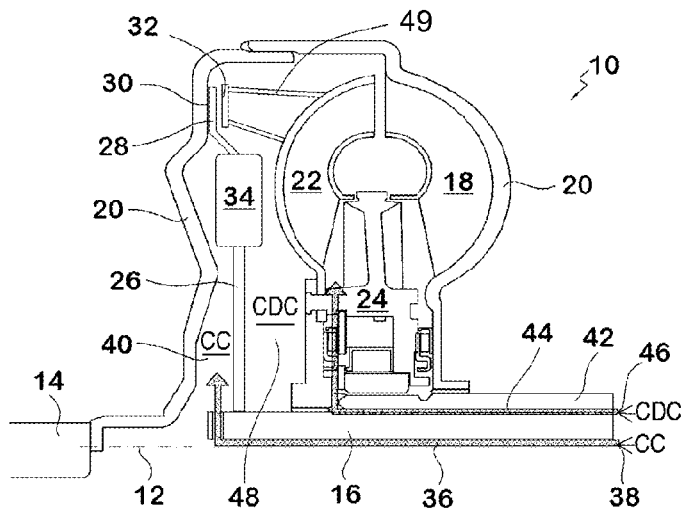
FIG. 1 shows a cross-sectional view through a torque converter in a state in which the transmission input shaft is coupled to an engine output shaft.

Referring to the drawings, wherein like characters represent examples of the same or corresponding parts throughout the several views, there is shown an exemplary torque converter assembly for a vehicle transmission. The exemplary illustrated torque converter assembly is advantageous in that the torque converter has a sustainable stage that decouples a transmission input shaft from a torque converter turbine and engine output shaft without the need for an additional clutch.

Figure 2:
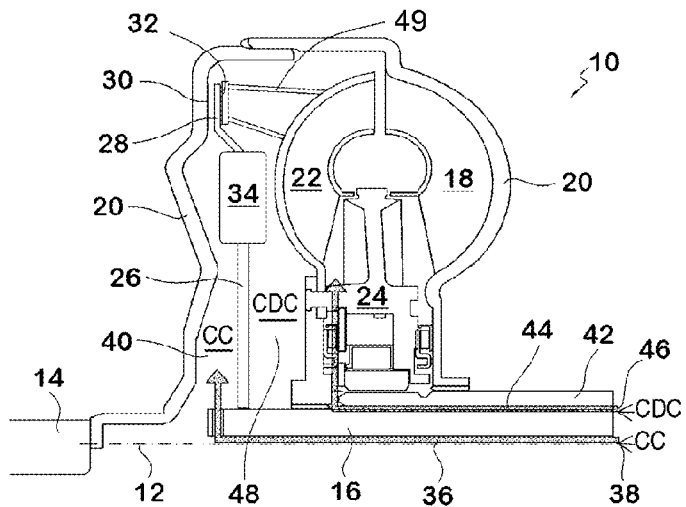
FIG. 2 shows a cross-sectional view through a torque converter in a state in which the transmission input shaft is coupled to a turbine.
Figure 3:
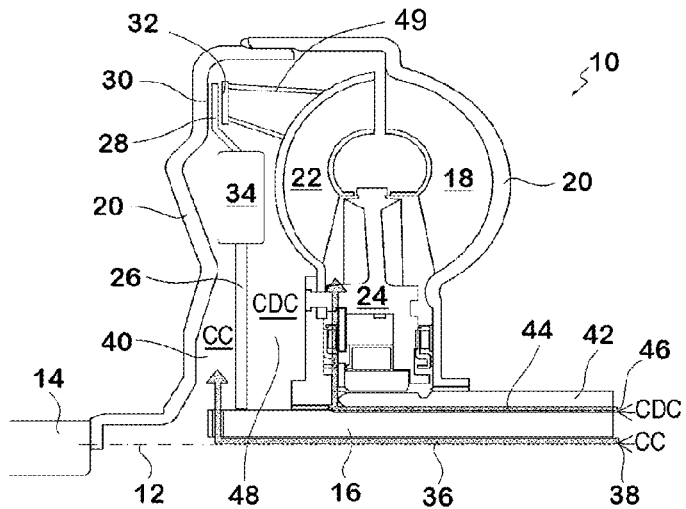
FIG. 3 shows a cross-sectional view through a torque converter in a state in which the transmission input shaft is not coupled.

Referring now to FIGS. 1-3, there is shown in each a cross-section through an exemplary vehicle transmission torque converter or torque converter assembly 10 that is substantially rotationally symmetrical about a central axis 12. Torque converter 10 contains an engine output shaft 14 and a transmission input shaft 16 that extend along central axis 12, a pump wheel 18 that is rotatably mounted about a transmission input shaft 16 and connected in a rotationally conjoint manner via a converter housing 20. Housing 20 is also rotatably mounted about transmission input shaft 16, to engine output shaft 14. A turbine 22 is rotatably mounted about transmission input shaft 16, a guide wheel 24 and a lock-up clutch.

The lock-up clutch, of FIGS. 1-3, contains a substantially disc-shaped clutch element 26 that extends annularly around transmission input shaft 16 and is connected in a rotationally conjoint manner thereto by means of a multi-tooth connection that simultaneously enables an axial displacement with respect to transmission input shaft 16. Disc-shaped clutch element 26 has an annular, radially external portion 28 that lies between a first frictional surface 30 formed on an inner surface of converter housing 20 and a second frictional surface 32 connected fixedly to turbine 22. In each case annular radially external portion 28 can touch one of the two frictional surfaces 30, 32 or neither of these when disc-shaped clutch element 26 is axially moved (as shown in FIG. 3). Frictional surface 32 is connected to turbine 22 and is supported by an annular projection 49 that extends from the outside of turbine 22 in the direction of the radially external portion 28 of clutch element 26. A torsional damper 34 is integrated into clutch element 26. The lock-up clutch comprises parts labeled as 26, 28, 30, 32 and 34.

Transmission input shaft 16 is embodied as a hollow shaft and contains a first central fluid channel 36 through which hydraulic fluid that is under a converter charging pressure (or "CC") can be supplied from a first fluid connection 38 on one hand to pump wheel 18 and on the other hand to a chamber 40 between converter housing 20 and disc-shaped clutch element 26 or conducted away therefrom. A hollow shaft 42 extends annularly around an axial portion of transmission input shaft 16. Transmission input shaft 16 and hollow shaft 42 delimit a second radial fluid channel 44 between them through which hydraulic fluid that is under converter discharging pressure (or "CDC") can be supplied from a second fluid connection 46 on one hand to guide wheel 24 and on the other hand to a chamber 48 between turbine 22 and disc-shaped clutch element 26 or conducted away therefrom. A two-channel hydraulic fluid guide can alternatively be formed with two radial fluid channels instead of with a central fluid channel 36 and a radial fluid channel 44.

If converter charging pressure is lower than converter discharging pressure, radially external portion 28 of disc-shaped clutch element 26 is pressed against frictional surface 30 internally on converter housing 20, as shown in FIG. 1, and torque converter 10 is in a lock-up state or stage. In this state, the output torque is precisely equal to the input torque, i.e. equal to the torque of the internal combustion engine that drives engine output shaft 14. Hydraulic fluid flows in through the second fluid connection 46 and out through the first fluid connection 38.

If converter charging pressure is higher than converter discharging pressure, radially external portion 28 of disc-shaped clutch element 26 is pressed against frictional surface 32 fixed on the turbine, as shown in FIG. 2, and torque converter 10 is located in an operating state with torque conversion. In this state, the output torque is equal to the input torque multiplied by a torque conversion factor. Hydraulic fluid flows in through the first fluid connection 38 and out via second fluid connection 46.

If converter charging pressure is equal to converter discharging pressure, radially external portion 28 of disc-shaped clutch element 26 can rotate freely between frictional surfaces 30 and 32, as shown in FIG. 3, and torque converter 10 is located in a state in which the torque converter does not transmit any torque. In this state as well no hydraulic fluid flows through torque converter 10.

The lock-up clutch forms a type of two-way clutch that couples the transmission input shaft either to the engine output shaft or to the turbine or to neither of these two. The torque converter disclosed can thus have less packaging space, parts and weight than contemporary designs. It is also possible to integrate the torque converter into existing engine series that have been designed for torque converters without the possibility of uncoupling of the transmission input shaft.

In one embodiment, the lock-up clutch has a torsional damper where the torsional damper can be integrated into the disc-shaped clutch element.

Those familiar with the art to which this invention relates will recognize various alternative designs and embodiments for practicing the invention within the scope of the appended claims.

I claim:

1. A torque converter assembly, comprising:
   an engine output shaft;
   a turbine including a turbine frictional element rotatably fixed thereto;
   a transmission input shaft;
   a converter housing rotationally fixed to the output shaft and including a housing frictional element;
   a lock-up clutch including a disc-shaped member rotationally fixed to and axially slidable on the input shaft;
   a first hydraulic fluid filled cavity applying pressure to a first side of the disc to axially move the member along the input shaft toward engaging the housing frictional element to mechanically couple the input shaft to the output shaft;
   a second hydraulic fluid filled cavity applying pressure to an opposed second side of the disc to axially move the member along the input shaft toward engaging the turbine frictional element to mechanically couple the input shaft to the turbine;
   wherein the torque converter includes two external connections for hydraulic fluid, a first connection for hydraulic fluid that is under a converter charging pressure (CC) and a second connection for hydraulic fluid that is under a converter discharging pressure (CDC);
   wherein the lock-up clutch is configured to decouple the input shaft from both the output shaft and the turbine when the CC is substantially equal to the CDC;
   wherein the lock-up clutch is configured to couple the transmission input shaft to the engine output shaft if the CC is lower than the CDC;
   wherein the lock-up clutch is configured to couple the transmission input shaft to the turbine when the CC is higher than the CDC; and
   wherein the lock-up clutch is configured to decouple the transmission input shaft when the CC is substantially equal to the CDC.

2. The torque converter assembly of claim 1, wherein the disc is configured to be acted upon in the second cavity by the hydraulic fluid that is under CC and is configured to be acted upon in the first cavity by the hydraulic fluid that is under CDC.

3. The torque converter assembly of claim 2, wherein the lock-up clutch is configured such that a difference between the CC and CDC governs whether the lock-up clutch couples the transmission input shaft to the engine output shaft, couples the transmission input shaft to the turbine or decouples the input shaft.

4. The torque converter assembly of claim 1, wherein the lock-up clutch is configured so that the difference between the CC and CDC governs whether the lock-up clutch couples the transmission input shaft to the engine output shaft, couples the transmission input shaft to the turbine or decouples the input shaft.

5. The torque converter assembly of claim 1, wherein the disc-shaped member includes two axially opposite frictional surfaces at a radially outer end of the member: a first frictional surface adjacent to the housing frictional element and a second frictional surface adjacent to the turbine frictional element.

6. The torque converter assembly of claim 5, wherein the turbine frictional element extends axially away from the turbine toward the housing frictional element.

7. The torque converter assembly of claim 6, wherein a turbine frictional surface is connected fixedly to the turbine frictional element.

8. The torque converter assembly of claim 1, wherein a turbine frictional surface is connected fixedly to the turbine frictional element.

9. The torque converter assembly of claim 1, wherein the lock-up clutch includes a torsional damper that is integrated into the disc-shaped member.

10. A torque converter assembly, comprising:
    an engine output shaft;
    a turbine including a turbine frictional element rotatably fixed thereto;
    a transmission input shaft;
    a converter housing rotationally fixed to the output shaft and including a housing frictional element;
    a lock-up clutch including a disc-shaped member rotationally fixed to and axially slidable on the input shaft;
    a first hydraulic cavity applying pressure to a side of the disc;
    a second hydraulic cavity applying pressure to an opposed side of the disc;
    wherein a substantially equal pressure in the first and second cavities axially slides the member out of contact with the turbine frictional element and the housing frictional element so that the transmission input shaft is decoupled from both the engine output shaft and the turbine;

wherein when in a first stage the lock-up clutch is configured to sustain the transmission input shaft being coupled to the engine output shaft;

wherein when in a second stage the lock-up clutch is configured to sustain the transmission input shaft being coupled to the turbine;

wherein when in a third stage the lock-up clutch is configured to sustain the transmission input shaft being decoupled from the engine output shaft and the turbine;

wherein the torque converter includes two external connections for hydraulic fluid: a first connection that is under a converter charging pressure (CC) and a second connection that is under a converter discharging pressure (CDC);

wherein the lock-up clutch is configured to operate in the first stage if the CC is lower than the CDC;

wherein the lock-up clutch is configured to operate in the second stage when the CC is higher than the CDC; and wherein the lock-up clutch is configured to operate in the third stage when the CC is substantially equal to the CDC.

11. The torque converter assembly of claim 10, wherein the lock-up clutch is configured such that a difference between the CC and CDC governs whether the lock-up clutch couples the transmission input shaft to the engine output shaft, couples the transmission input shaft to the turbine or decouples the input shaft.

12. The torque converter assembly of claim 10, wherein the lock-up clutch includes: a first frictional surface opposite the housing frictional element and a second frictional surface opposite the turbine frictional element.

13. The torque converter assembly of claim 12, wherein the turbine frictional element extends axially away from the turbine toward the housing frictional element.

14. A torque converter assembly, comprising:
a transmission input shaft;
a disc-shaped member rotationally fixed to and axially slidable on the input shaft;
a first hydraulic cavity applying pressure to a side of the member;
a second hydraulic cavity applying pressure to an opposed side of the member;
wherein an equal pressure in the cavities axially slides the member to decouple the input shaft from an engine output shaft and a torque converter turbine;
wherein the first cavity applying pressure to the side of the member to axially move the member along the input shaft toward engaging a converter housing frictional element to mechanically couple the input shaft to the output shaft; and
the second cavity applying pressure to the opposed second side of the member to axially move the member along the input shaft toward engaging a turbine frictional element to mechanically couple the input shaft to the turbine.

* * * * *